United States Patent
Ping

(10) Patent No.: US 11,372,460 B2
(45) Date of Patent: Jun. 28, 2022

(54) SYSTEMS, METHODS, AND APPARATUS USING ARTIFICIAL INTELLIGENT COOLING METHOD FOR SERVER AND SSD

(71) Applicant: Samsung Electronics Co., Ltd., Suwon-si (KR)

(72) Inventor: John Ping, San Jose, CA (US)

(73) Assignee: SAMSUNG ELECTRONICS CO., LTD.

(*) Notice: Subject to any disclaimer, the term of this patent is extended or adjusted under 35 U.S.C. 154(b) by 1079 days.

(21) Appl. No.: 15/967,476

(22) Filed: Apr. 30, 2018

(65) Prior Publication Data

US 2019/0265764 A1    Aug. 29, 2019

Related U.S. Application Data

(60) Provisional application No. 62/634,836, filed on Feb. 24, 2018.

(51) Int. Cl.
*G06F 1/20*   (2006.01)
*G05B 13/02*  (2006.01)

(52) U.S. Cl.
CPC .......... *G06F 1/206* (2013.01); *G05B 13/024* (2013.01); *G05B 13/026* (2013.01); *G05B 13/027* (2013.01); *G06F 1/20* (2013.01)

(58) Field of Classification Search
CPC ..... G06F 1/206; G05B 13/024; G05B 13/026; G05B 13/027; G01F 1/20
See application file for complete search history.

(56) References Cited

U.S. PATENT DOCUMENTS

| | | | |
|---|---|---|---|
| 9,841,773 B2 | 12/2017 | Conan et al. | |
| 9,846,444 B1* | 12/2017 | Yang | G05D 23/1919 |
| 2013/0190930 A1 | 7/2013 | Yi | |
| 2016/0011607 A1* | 1/2016 | James | H05K 7/20 700/300 |
| 2016/0062326 A1* | 3/2016 | Bang | G06F 1/206 700/299 |

(Continued)

OTHER PUBLICATIONS

Definition of circuit, (n.d.) American Heritage® Dictionary of the English Language, Fifth Edition. (2011). Retrieved Nov. 2, 2021 from https://www.thefreedictionary.com/circuit (Year: 2011).*

(Continued)

*Primary Examiner* — Michael Jung
(74) *Attorney, Agent, or Firm* — Renaissance IP Law Group LLP

(57) ABSTRACT

According to one general aspect, an apparatus may include a memory storage device. The memory storage device may include a plurality of memory cells configured to store data. The memory storage device may include a first temperature sensor configured to detect a temperature of the memory cells. The memory storage device may include an artificial intelligence system configured to dynamically determine a thermal management setting to be employed by the memory storage device, based, at least in part, upon the first temperature sensor and a workload of the memory storage device. The memory storage device may dynamically changes a set of operational parameters in response to the thermal management setting determined by the artificial intelligence system.

18 Claims, 4 Drawing Sheets

(56) References Cited

U.S. PATENT DOCUMENTS

| | | | | |
|---|---|---|---|---|
| 2016/0062423 A1* | 3/2016 | Kim | ................... | H04M 1/7246 |
| | | | | 713/320 |
| 2017/0024254 A1* | 1/2017 | Shows | ................... | G06F 3/061 |
| 2017/0060202 A1* | 3/2017 | Sundaram | ............ | G06F 1/3275 |
| 2017/0115675 A1 | 4/2017 | Demetriou et al. | | |
| 2018/0067507 A1* | 3/2018 | Nielsen | ................... | G06F 1/206 |

OTHER PUBLICATIONS

Zhang et al., "Machine Learning-Based Temperature Prediction for Runtime Thermal Management across System Components", IEEE Transactions on Parallel and Distribute, vol. XX, No. YY, Mar. 2016.

\* cited by examiner

200

SYSTEMS, METHODS, AND APPARATUS USING ARTIFICIAL INTELLIGENT COOLING METHOD FOR SERVER AND SSD

CROSS-REFERENCE TO RELATED APPLICATION

This application claims priority under 35 U.S.C. § 119 to Provisional Patent Application Ser. No. 62/634,836, entitled "ARTIFICIAL INTELLIGENT COOLING METHOD FOR SERVER AND SSD" filed on Feb. 24, 2018. The subject matter of this earlier filed application is hereby incorporated by reference.

TECHNICAL FIELD

This description relates to computing technology, and more specifically to an artificial intelligent (AI) cooling method for server and solid-state devices (SSDs).

BACKGROUND

More and more data is being generated from, for example, mobile devices, Internet-of-Things (IOT) sensors, electrical cars, commercial transaction data etc. This data requires datacenters to be able to handle the increasing levels of data with high density and high-performance storage. This increased storage and processing of data demands effectively cooling and efficient thermal solution for storage devices at a system level.

Traditionally computing devices are cooled by static settings that define how the computing device is cooled. Traditionally these settings are pre-determined (e.g., at a factory or across a set of devices) based upon modelling or a "best guess" analysis. As a result, the thermal settings are not optimized and are not able to adapt to changing conditions.

Artificial neural networks (ANNs) or connectionist systems are generally computing systems vaguely inspired by the biological neural networks that constitute animal brains. Such systems "learn" (i.e., progressively improve performance on) tasks by considering examples, generally without task-specific programming. For example, in image recognition, they might learn to identify images that contain cats by analyzing example images that have been manually labeled as "cat" or "no cat" and using the results to identify cats in other images. They do this without any a priori knowledge about cats, e.g., that they have fur, tails, whiskers and cat-like faces. Instead, they evolve their own set of relevant characteristics from the learning material that they process.

A neural network is often based on a collection of connected units or nodes called artificial neurons. Each connection (a simplified version of a synapse) between artificial neurons can transmit a signal from one to another. The artificial neuron that receives the signal can process it and then signal artificial neurons connected to it. In common neural network implementations, the signal at a connection between artificial neurons is a real number, and the output of each artificial neuron is calculated by a non-linear function of the sum of its inputs. Artificial neurons and connections typically have a weight that adjusts as learning proceeds. The weight increases or decreases the strength of the signal at a connection. Artificial neurons may have a threshold such that only if the aggregate signal crosses that threshold is the signal sent. Typically, artificial neurons are organized in layers. Different layers may perform different kinds of transformations on their inputs. Signals travel from the first (input), to the last (output) layer, possibly after traversing the layers multiple times.

SUMMARY

According to one general aspect, an apparatus may include a memory storage device. The memory storage device may include a plurality of memory cells configured to store data. The memory storage device may include a first temperature sensor configured to detect a temperature of the memory cells. The memory storage device may include an artificial intelligence system configured to dynamically determine a thermal management setting to be employed by the memory storage device, based, at least in part, upon the first temperature sensor and a workload of the memory storage device. The memory storage device may dynamically changes a set of operational parameters in response to the thermal management setting determined by the artificial intelligence system.

According to another general aspect, a computing device may include a memory storage device configured to store data. The computing device may include a controller configured to manage a physical state of the computing device. The computing device may include a cooling device configured to, at least partially, cool the computing device. The controller may include an artificial intelligence system configured to dynamically determine a thermal management setting to be employed by the cooling device, based, at least in part, upon a temperature of the memory storage device and a workload of the memory storage device. The cooling device may be configured to dynamically attempt to increase or decrease a temperature of the computing device based upon the thermal management setting determined by the artificial intelligence system.

According to another general aspect, a system may include a processor configured to, at least partially, dictate a workload of the memory storage device. The system may include a memory storage device configured to store data. The memory storage device may include a first artificial intelligence system configured to dynamically determine a local thermal management setting to be employed by the memory storage device, based, at least in part, upon detected temperature or at least a portion of the memory storage device and the workload of the memory storage device. The system may include a cooling device configured to, at least partially, cool the system. The system may include a management controller configured to manage a physical state of the system. The management controller may include a second artificial intelligence system configured to dynamically determine a system thermal management setting to be employed by the cooling device, based, at least in part, upon a temperature of the memory storage device and a workload of the memory storage device.

The details of one or more implementations are set forth in the accompanying drawings and the description below. Other features will be apparent from the description and drawings, and from the claims.

A system and/or method for computing technology, and more specifically to an artificial intelligent (AI) cooling method for server and solid-state devices (SSDs), substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
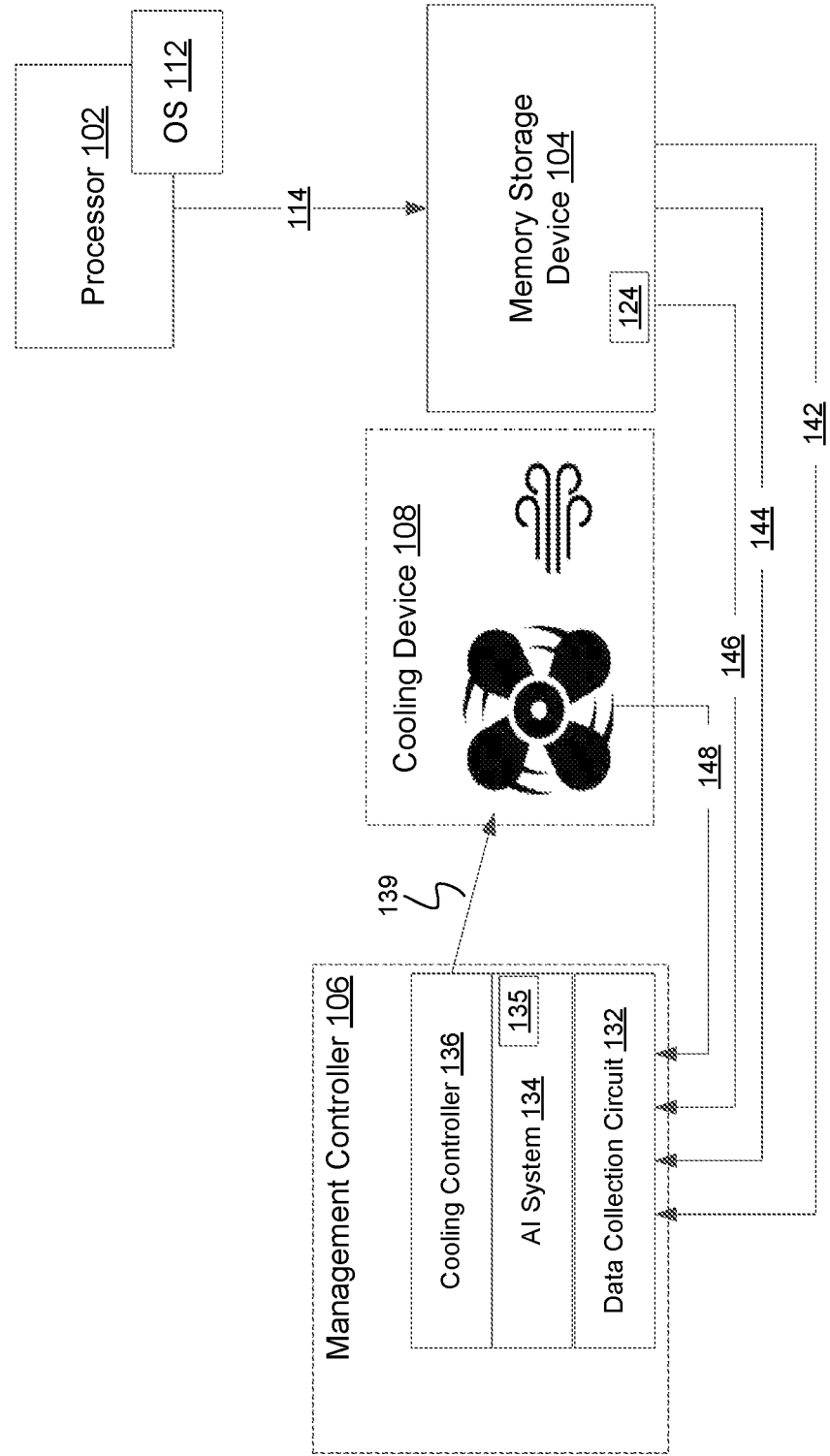
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Likewise, electrical terms, such as "high" "low", "pull up", "pull down", "1", "0" and the like, may be used herein for ease of description to describe a voltage level or current relative to other voltage levels or to another element(s) or feature(s) as illustrated in the figures. It will be understood that the electrical relative terms are intended to encompass different reference voltages of the device in use or operation in addition to the voltages or currents depicted in the figures. For example, if the device or signals in the figures are inverted or use other reference voltages, currents, or charges, elements described as "high" or "pulled up" would then be "low" or "pulled down" compared to the new reference voltage or current. Thus, the exemplary term "high" may encompass both a relatively low or high voltage or current. The device may be otherwise based upon different electrical frames of reference and the electrical relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In various embodiments, the system 100 may include a computing device. It is understood that the above is merely one illustrative example to which the disclosed subject matter is not limited.

In various embodiments, the system 100 may include a computing device, such as, for example, a laptop, desktop, workstation, personal digital assistant, smartphone, tablet, and other appropriate computers or a virtual machine or virtual computing device thereof. In some embodiments, the system 100 may include a server or rack-mounted device. In such an embodiment, the system 100 may be found in a data center or other high-density computing environment. It is understood that the above are merely a few illustrative examples to which the disclosed subject matter is not limited.

In various embodiments, the system 100 may include a processor 102 configured to execute one or more machine executable instructions or pieces of software, firmware, or a combination thereof. The system 100 may include, in some embodiments, a memory, storage medium, or memory storage device 104 configured to store one or more pieces of data, either temporarily, permanently, semi-permanently, or a combination thereof.

In various embodiments, the processor 2102 may execute or run an operating system (OS) 112 or other form of software. The processor 102/OS 112 may make a number of data access (read and/or write commands) to the memory storage device 104. In such an embodiment, the initial data access from the processor 102 (e.g., requesting data, storing data) may be a data access request and the completing data access (e.g., returning the data, reporting success or failure) by the memory storage device 104 may be referred to as a data access completion. It is understood that the above are merely a few illustrative examples to which the disclosed subject matter is not limited.

In general, these data accesses may be referred to as a workload 114 of the memory storage device 104. In various embodiments, if the number of data accesses is high, then the workload 114 may be high and vice versa. Further, in various embodiments, the workload 114 may include a number of data accesses that cause more or less heat to be generated by the memory (e.g., more writes than reads, more data accesses to multiple cache lines as opposed to a single cache line). It is understood that the above are merely a few illustrative examples to which the disclosed subject matter is not limited.

In various embodiments, the memory storage device 104 may include a solid-state drive or disk (SSD) or other form of memory technology. In general, an SSD is a solid-state storage device that uses integrated circuit assemblies as memory to store data persistently.

In another embodiment, the illustrated memory storage device 104 may be any device within the computing system or device 100 that generates heat. Examples of such heat generating devices may include graphic processors, chipsets, the processor 102 itself, etc. However, for ease of illustration, the heat generating device will be referred to as memory storage device 104. It is understood that the above is merely one illustrative example to which the disclosed subject matter is not limited.

In the illustrated embodiment, the system 100 may include a cooling device 108. In various embodiments, the cooling device 108 may include a fan that blows air across the memory storage device 104, thus moving the heat generated by the memory storage device 104 to somewhere else (and cooling the memory storage device 104). In another embodiment, the cooling device 108 may include a liquid cooling device that cools via circulation of and/or immersion (partial of otherwise) in water, oil, or another liquid. In yet another embodiment, the cooling device 108 may include a piezoelectric pump. It is understood that the above are merely a few illustrative examples to which the disclosed subject matter is not limited. Again, for ease of illustration the cooling device 108 will be most often referred to as a fan, but it is understood that the above is merely one illustrative example to which the disclosed subject matter is not limited.

In the illustrated embodiment, the cooling device 108 may be configured to provide changeable levels of cooling. For example, the fan speed of the cooling device 108 may be increased or decreased, the cooling device 108 may include multiple fans of which any number may be turned off or on, the cooling device 108 may rotate, or provide cool air from multiple sources (e.g., ambient air, compressed air, air-conditioned air, etc.). It is understood that the above are merely a few illustrative examples to which the disclosed subject matter is not limited. In the illustrated embodiment, the cooling device 108 may be configured to dynamically change the level of cooling provided to the system 100 or the memory storage device 104, specifically.

In various embodiments, the memory storage device 104 may operate in an environment where the desired ambient temperature is approximately or substantially 40° C. or less. In various embodiments, the temperature of the memory storage device 104 may increase as the workload increased or changes in character (to something more intensive), and may decrease as the workload lightens (e.g., in intensity or character). In some embodiments, the temperature of the memory storage device 104 may increase to over 100° C. As the temperature increases this may lessen the available performance or increase power usage. This may be undesirable.

In the illustrated embodiment, the system 100 may include a management controller or processor 106. In various embodiments, the management controller 106 may include a baseboard management controller (BMC) that may be is a specialized service processor that monitors the physical state of a computer, network server or other hardware device (e.g., the system 100) using sensors and communicating with the system administrator through an independent connection. In some embodiments, the management controller 106 may be part of the processor 102 (e.g., a system on a chip (SoC)).

In the illustrated embodiment, the management controller 106 may include an artificial intelligence (AI) system or circuit 134. The AI system 134 may be configured to dynamically adjust the amount of cooling provided to or temperature of the memory storage device 104 or system 100, in general.

In various embodiments, the AI system 134 may include a neural network (e.g., a deep feedforward neural network, a deep recurrent neural network). It is understood that the above is merely one illustrative example to which the disclosed subject matter is not limited. In another embodiment, the AI system 134 may include symbolic AIs, cognitive simulation, heuristics, or other form of AI. It is understood that the above are merely a few illustrative examples to which the disclosed subject matter is not limited.

This differs from traditional systems in which the system's cooling settings or parameters are static and fixed and do not change as the system changes. In various embodiments, the static settings may be rule based (e.g., if a temperature exceeds a threshold, increase fan speed). Traditionally temperature settings are reactive and only change the cooling settings (e.g., fan speed) after the temperature has increased.

In the illustrated embodiment, the artificial intelligence (AI) system 134 may be configured to adjust the cooling or thermal management settings 135 based upon more than just the temperature of the memory storage device 104 or system 100 at a given moment. In the illustrated embodiment, the artificial intelligence (AI) system 134 may be configured to adjust the cooling settings or thermal management settings 135 not only dynamically or adaptively (as opposed to static rules or settings), but also predictively, such that an increase (or decrease) in temperature may be predicted and the cooling or thermal management settings 135 may be changed before the actual temperature increases/decreases. In various embodiments, the AI system 134 may be configured to provide a quick response to thermal fluctuations. It is understood that the above are merely a few illustrative examples to which the disclosed subject matter is not limited.

In the illustrated embodiment, the management controller 106 may include a data collection circuit 132. In such an embodiment, the data collection circuit 132 may be configured to collect or receive data or signals from a plurality of sources and input them (in either raw, filtered, or processed form) to the AI system 134.

In the illustrated embodiment, the data collection circuit 106 may be configured to receive information or data on the workload 142. In various embodiments, this may be the workload 114 or data accesses requested by the processor 102, the overall workload experienced by the memory storage device 104, and/or the workload of data accesses fulfilled or responses provided by the memory storage device 104.

In the illustrated embodiment, the data collection circuit 106 may be configured to receive information or data regarding the amount of power 144 consumed or provided to the memory storage device 104. In the illustrated embodiment, the data collection circuit 106 may be configured to receive information or data regarding the temperature 146 of the memory storage device 104. In various embodiments, this may include details on the temperature of specific portions (e.g., the memory cells or internal controller) of the memory storage device 104 and/or the memory storage device 104 as a whole. In the illustrated embodiment, the data collection circuit 106 may be configured to receive information or data regarding the state, workload (e.g., fan speed) 148, or settings of the cooling device 108. It is understood that the above are merely a few illustrative examples to which the disclosed subject matter is not limited.

In the illustrated embodiment, the AI system 134 may take these pieces of data 142, 144, 146, and 148 and determine which cooling or thermal settings 135 are desirable for the given moment.

In the illustrated embodiment, the management controller 106 may include a cooling controller circuit 136. In various embodiments, the cooling controller circuit 136 may be configured to interface with the cooling device 108. In such an embodiment, the cooling controller circuit 136 may translate (if needed) the determined cooling or thermal settings 135 to commands or signals 139 the cooling device 108 may understand. For example, if the thermal settings 135 indicate that more cooling is desired, the cooling controller circuit 136 may apply more voltage (via signal 139) and increase the fan speed of the cooling device 108. It is understood that the above is merely one illustrative example to which the disclosed subject matter is not limited.

As described above, in various embodiments, the AI system 134 may maintain a history of these settings (either as data or as weights in the neural network). In various embodiments, the AI system 134 may use this history to predict what the future temperature of the system 100 or memory storage device 104 may be. In such an embodiment, the AI system 134 may proactively and predictively attempt to precool or lower the temperature of the system 100 or memory storage device 104, such that when the temperature does rise it starts at a lower place and therefore peaks at a lower place.

For example, if the workflow 142 is similar to one that preceded a previous higher temperature, the AI system 134 may recognize this and predict that a future higher temperature may occur. In one such embodiment, the workflow 142 may indicate that the memory addresses are being accessed that were accessed before a heavy workflow started last time, or a pattern of memory requests are occurring that have the same pattern as a previous high workload event, and so on. In various embodiments, the AI system 134 may see the workflow 142 (e.g., read/write requests) before the memory storage device 104 processes them) and generates the heat), or the AI system 134 may engage in pattern recognition or other predictive technique. It is understood that the above are merely a few illustrative examples to which the disclosed subject matter is not limited.

In such an embodiment, the AI system 134 may dynamically change the thermal settings 135 to a more aggressive stance. The cooling device 108 may then change its behavior accordingly (e.g., increase fan speed, pump more water). The memory storage device 104 may then have its temperature lowered, or the rate of increase in temperature may be reduced. For example, the cooling may occur faster than it would without the predictive abilities of the AI system 134. In such an embodiment, the amount of energy used to cool the system 100 or memory storage device 104 may be reduced.

In various embodiments, the AI system 134 may be trained in real-time or in an online mode, when the system 10 is operational. In such an embodiment, as the system 100 operates and generates the data (e.g., data 142, 144, 146, and 148), the weights or other decision making mechanisms of the AI system 134 may learn or be trained as to what the appropriate actions to take or thermal settings 135 are to be selected for a given situation are.

In various embodiments, when the system 100 shutdown, ceases operation, or it is otherwise desired to be done, these training values or weights may be stored (e.g., in the memory storage device 104, in a non-volatile memory, or externally). In such an embodiment, these training values or weights may be re-loaded or re-stored into the AI system 134 when the system 100 becomes operational again.

In another embodiment, the AI system 134 may be trained in an offline mode (i.e., not based upon data provided in real-time by the system 100), or using training data not created by the system 100. In one such embodiment, a typical system 100 may be used to train the AI system 134 and then those training values or weights may be copied or replicated to multiple systems (e.g., an entire datacenter or server farm). In one such embodiment, these the AI system 134 may have a default set of training values or weights stored in a firmware (not shown) of the management controller 106 or system 100.

In various embodiments, the AI system 134 may be trained by a mixture of the above. In one such embodiment, the AI system 134 may be loaded offline with default training values or weights. These default training values may be augmented by stored training values from prior instances of the system 100 being operational. And then, the AI system 134 may be trained in real-time or an on-line mode as the system 100 runs or operates. In such an embodiment, the AI system 134 may be as trained as possible or have a greater degree of training then if it started un-trained every time the system 100 booted.

Figure 2:
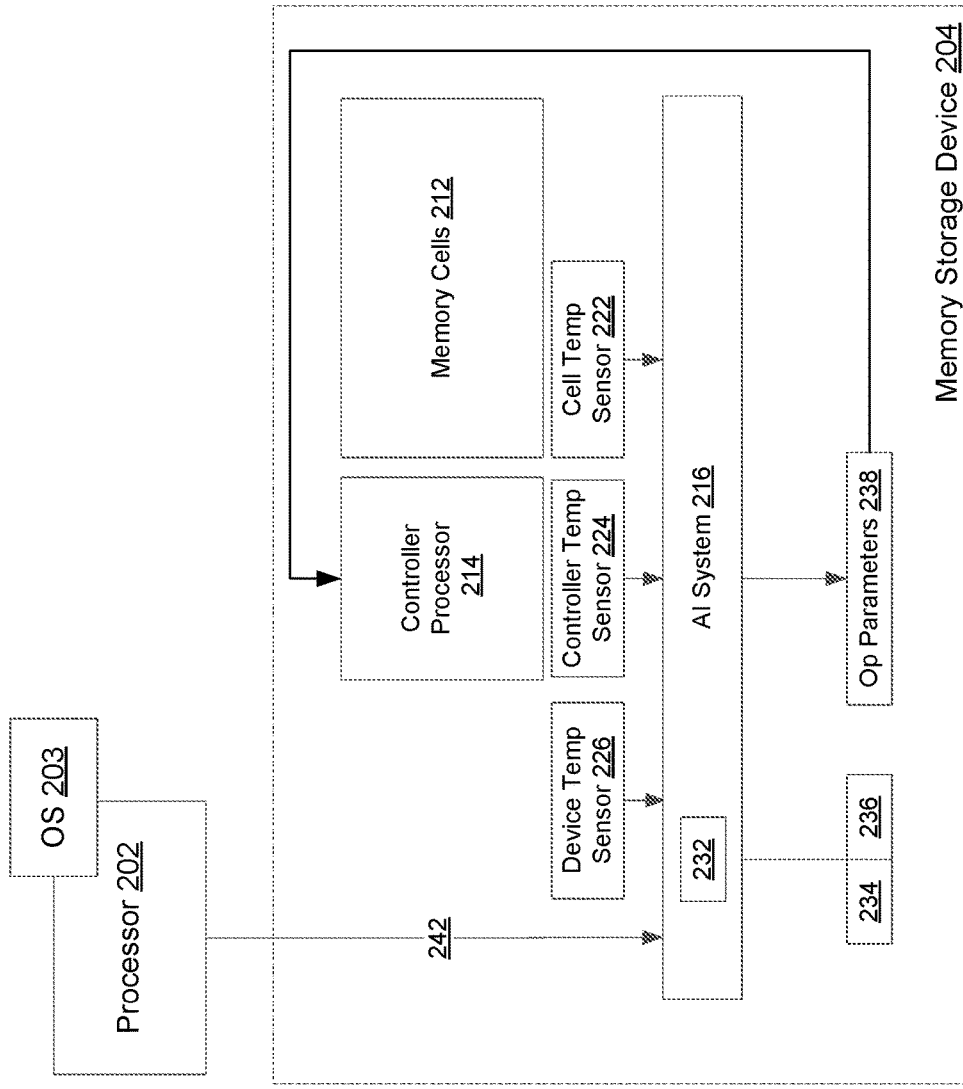
FIG. 2 is a block diagram of an example embodiment of a system in accordance with the disclosed subject matter.

FIG. 2 is a block diagram of an example embodiment of a system 200 in accordance with the disclosed subject matter. In various embodiments, the system 200 may include a processor 202 and a memory storage device 204.

As described above, the processor 202 may be configured to execute an operating system 203 or other software. The processor 202 may control, at least partially, a workflow 242 of data accesses or other operations to be executed or performed by the memory storage device 204.

As described above, the memory storage device 204 may be configured to store data. The memory storage device 204 may include a solid-state device (SSD) with FLASH memory, but is not limited to such. Further, the disclosed subject matter is not limited a storage medium or memory storage device 204, but may apply to any computing device component (e.g., a graphics processor, a chipset). However, the memory storage device 204 will be used an illustrative example. It is understood that the above is merely one illustrative example to which the disclosed subject matter is not limited.

In the illustrated embodiment, the memory storage device 204 may include a plurality of memory cells 212 that are configured to actually store the data. The memory storage device 204 may also include a controller processor 214 that is configured to execute the workload 242, or operations requested by the processor or as needed for internal housekeeping (e.g., garbage cleaning). In various embodiments, the controller processor 214 may be configured to perform these operations based upon a set of operational parameters 238.

In such an embodiment, these operational parameters 238 may include such things as: a size of a read/write unit, a size of an erase unit, a size of a read buffer, and a size of a write buffer, a throttling threshold, an amount of memory cell utilization, a cache size and a frequency of garbage collection. In various embodiments, these operational parameters 238 may affect, at least in part, the performance and/or power consumption of the memory storage device 204. As a result, these operational parameters 238 may affect the amount of heat generated by the memory storage device 204.

In various embodiments, the memory storage device 204 may include a number of thermal or temperature sensors configured to detect or indicate the temperature of one or more parts of the memory storage device 204. In the illustrated embodiment, the memory storage device 204 may include a device temperature sensor 226 configured to indicate the current temperature of the memory storage device 204 as a whole (or at least where the sensor 226 is placed). In the illustrated embodiment, the memory storage device 204 may include a controller temperature sensor 224 configured to indicate the current temperature of the controller processor 214. In the illustrated embodiment, the memory storage device 204 may also include a memory cell temperature sensor 222 configured to indicate the current temperature of the memory cells 212.

In the illustrated embodiment, the memory storage device 204 may include an AI system, model or circuit 216. In various embodiments, the AI system 216 may include a neural network or other form of AI, as described above. In such an embodiment, the AI system 216 may be configured to select or determine a set of thermal settings 232 to manage or attempt to manage the temperature of the memory storage device 204.

In the illustrated embodiment, the AI system 216 may work very similarly to the AI system of FIG. 1. However, whereas the AI system of FIG. 1 may attempt to manage the temperature of the computing device or server of FIG. 1, as a whole, or in various embodiments, the storage component of FIG. 1, the AI system 216 of FIG. 2 is directed solely to the temperature of the memory storage device 204. In various embodiments, a system-level AI (e.g., the AI system of FIG. 1) may work in conjunction with a device-level AI (e.g., AI system 216). In such an embodiment, the two AI systems (e.g., of FIG. 1 and of FIG. 2) may communicate with each other (e.g., the device-level AI may provide early temperature data or predictions to the system-level AI). In another embodiment, they may work independently or in isolation. It is understood that the above are merely a few illustrative examples to which the disclosed subject matter is not limited.

In the illustrated embodiment, the AI system 216 may receive input from the workload 242 and at least one of the sensors 222, 224, and 226. In various embodiments, the AI system 216 may receive input the memory cell temperature sensor 222. In another embodiment, the AI system 216 may also receive input from the device temperature sensor 226. In yet another embodiment, the AI system 216 may receive input from all three sensors 222, 224, and 226. It is understood that the above are merely a few illustrative examples to which the disclosed subject matter is not limited.

In such an embodiment, based upon these inputs 242, 222, 224, and 226, the AI system 216 may determine a desire set of cooling or thermal settings 232. As described above, in various embodiments, this may be based, at least partially, on the history or pattern of the workload 242. As part of the determination of the desired set of cooling or thermal settings 232, the AI system 216 may generate or predict a future temperature 234 and a desired temperature 236. In such an embodiment, the future temperature 234 may be in the temperature if no cooling action is taken or the set of thermal settings 232 are not changed. In various embodiments, this generation and determination may occur similarly to that described above.

In the illustrated embodiment, the AI system 216 may be configured to dynamically change one or more of the operating or operational parameters 238. In such an embodiment, as a result of the new operational parameters 238, the controller processor 214 may act in a way that reduces (or increases) the amount of heat generated by the memory storage device 204. For example, the controller processor 214 may cause data accesses to be performed more slowly, or garbage collection to be postponed, or data to be prefetched. It is understood that the above are merely a few illustrative examples to which the disclosed subject matter is not limited.

Similarly to that described above, in various embodiments, the AI system 216 may be trained in either an offline mode, an online mode, or a combination thereof. In various embodiments, similarly to that described above, the AI system 216 may be configured to precool or predictively adjust the thermal settings of the memory storage device 204 by providing early temperature adjustment. Further, in various embodiments, other features described above may apply to the device-level AI system 216, and features described herein may apply to the system-level AI.

In various embodiments, the AI system 216 may be configured to select the thermal settings 232 based upon outcomes other than the lowest predicted temperature. For example, a desired power efficiency or performance level may be selected. In one such an embodiment, if the predicted future temperature 234 is below or at a given threshold value, the AI system 216 may instruct the memory storage device 204 to increase performance, even if more heat is generated. In various embodiments, the processor 202 may indicate (e.g., via a command, or workload 242 pattern) that performance is critical even if the threshold heat (if any) is exceeded. In such embodiments, the temperature may not just be lower, but optimized or balanced. It is understood that the above are merely a few illustrative examples to which the disclosed subject matter is not limited.

Figure 3:
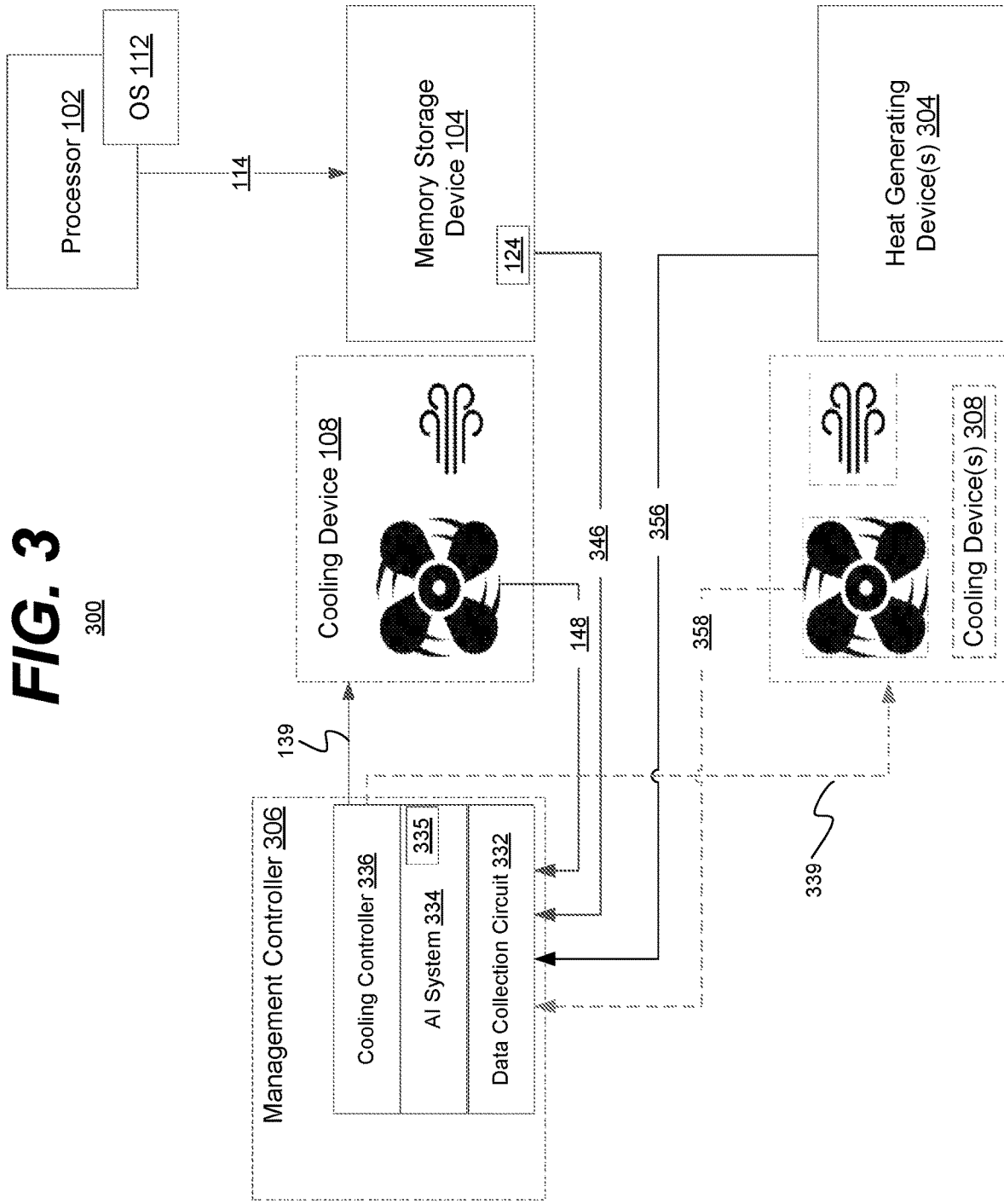
FIG. 3 is a block diagram of an example embodiment of a system in accordance with the disclosed subject matter.

FIG. 3 is a block diagram of an example embodiment of a system 300 in accordance with the disclosed subject matter. In various embodiments, the system 300 may include a computing device. It is understood that the above is merely one illustrative example to which the disclosed subject matter is not limited.

In various embodiments, the system 300 may include a computing device, such as, for example, a laptop, desktop, workstation, personal digital assistant, smartphone, tablet, and other appropriate computers or a virtual machine or virtual computing device thereof. In some embodiments, the system 300 may include a server or rack-mounted device. In such an embodiment, the system 300 may be found in a data center or other high-density computing environment. It is understood that the above are merely a few illustrative examples to which the disclosed subject matter is not limited.

As described above, the system 300 may include a processor 102 (running an OS 112), a memory storage device 104, a cooling device 108, and a management controller 306. In the illustrated embodiment, the management controller 306 may include a data collection circuit 332, an AI system 334, and a cooling controller 336, similar to those described above.

Like the system of FIG. 1, the management controller 306 may be configured to receive thermal-related data 346 (e.g., workload, thermal sensor data) from the memory storage device 104 and the cooling device 108. The management controller 306 may be configured to process this data 148 and 346 with the AI system 334, and using a determined set of thermal settings 335 dynamically, and possible predictively, adjust the operation of the cooling device 108.

In addition, in the illustrated embodiment, the system 300 may also include a second heat generating device 304 (wherein the memory storage device 104 was the first heat generating device). In various embodiments, the heat generating device 304 may include another processor (e.g., a graphics processor, co-processor), a chipset, a second storage device. In such an embodiment, the heat generating device 304 may provide work, consume power, and generate heat.

In such an embodiment, the management controller 306 may be configured to receive thermal-related data 356 (e.g., workload, thermal sensor data) from the heat generating device 304. The management controller 306 may be configured to process this data 356 with the AI system 334, and using a determined set of thermal settings 335 dynamically, and possible predictively, adjust the operation of the cooling device 108. In such an embodiment, the management controller 306 (and AI system 334) may manage the temperature of multiple heat generating devices 104 and 304. In various embodiments, the number of heat generating devices (e.g., devices 104 and 304) may be greater than two.

In a variation of the illustrated embodiment, the system 300 may include a second cooling device 308. In such an embodiment, the first cooling device 108 may be associated with the memory storage device 104, whereas the second cooling device 308 may be associated with the heat generating device 304. In such an embodiment, the second cooling device 308 may provide input data 358 to the management controller 306, similarly as the first cooling device 108 does.

In such an embodiment, the management controller 306 or the cooling controller 336 may provide commands or signals 339 to the second cooling device 308 in order to control it (e.g., adjust its fan speed), as described above, these commands or signals 339 may be based upon the thermal settings 335 determined by the AI system 334. In such an embodiment, the first and second cooling devices 108 and 308 may be controlled separately. In such an embodiment, the amount of cooling provided to, or the desired temperatures of the devices 104 and 304 may differ.

In various embodiments, the number of cooling devices may be greater than two. In yet another embodiment, each heat generating device (e.g., devices 104 and 304) may not be directly associated with a single cooling device, and their numbers may differ. In such an embodiment, one cooling device may be associated with multiple heat generating devices. In such an embodiment, a cooling device may be associated with a physical region of the system 300, and only associated with a heat generating device because that heat generating device is within a given physical region. It is understood that the above are merely a few illustrative examples to which the disclosed subject matter is not limited.

Figure 4:
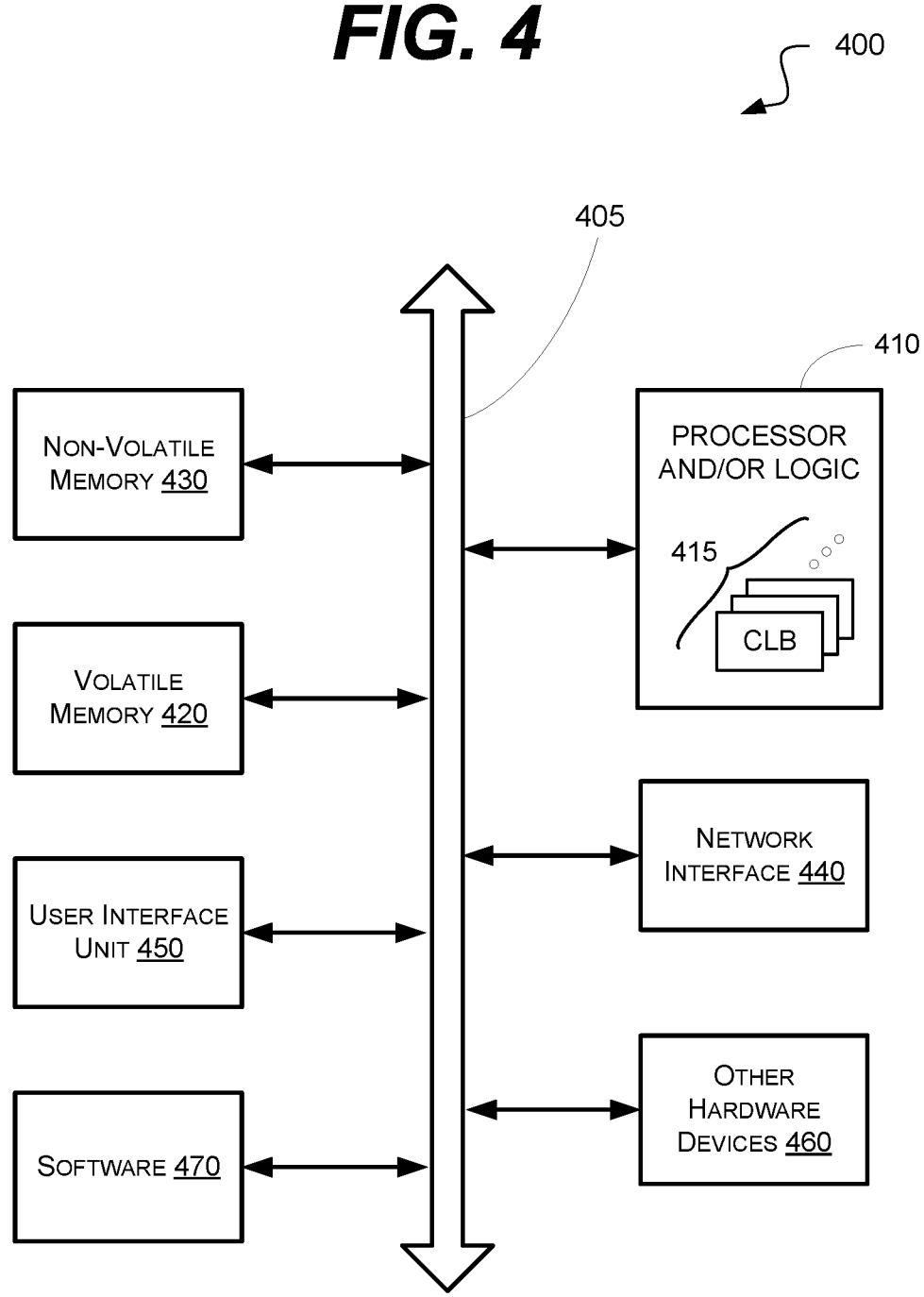
FIG. 4 is a schematic block diagram of an information processing system that may include devices formed according to principles of the disclosed subject matter.

FIG. 4 is a schematic block diagram of an information processing system 400, which may include semiconductor devices formed according to principles of the disclosed subject matter.

Referring to FIG. 4, an information processing system 400 may include one or more of devices constructed according to the principles of the disclosed subject matter. In another embodiment, the information processing system 400 may employ or execute one or more techniques according to the principles of the disclosed subject matter.

In various embodiments, the information processing system 400 may include a computing device, such as, for example, a laptop, desktop, workstation, server, blade server, personal digital assistant, smartphone, tablet, and other appropriate computers or a virtual machine or virtual computing device thereof. In various embodiments, the information processing system 400 may be used by a user (not shown).

The information processing system 400 according to the disclosed subject matter may further include a central processing unit (CPU), logic, or processor 410. In some embodiments, the processor 410 may include one or more functional unit blocks (FUBs) or combinational logic blocks (CLBs) 415. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 400 according to the disclosed subject matter may further include a volatile memory 420 (e.g., a Random Access Memory (RAM)). The information processing system 400 according to the disclosed subject matter may further include a non-volatile memory 430 (e.g., a hard drive, an optical memory, a NAND or Flash memory). In some embodiments, either the volatile memory 420, the non-volatile memory 430, or a combination or portions thereof may be referred to as a "storage medium". In various embodiments, the volatile memory 420 and/or the non-volatile memory 430 may be configured to store data in a semi-permanent or substantially permanent form.

In various embodiments, the information processing system 400 may include one or more network interfaces 440 configured to allow the information processing system 400 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., HomePlug, IEEE 1901). It is understood that the above are merely a few illustrative examples to which the disclosed subject matter is not limited.

The information processing system 400 according to the disclosed subject matter may further include a user interface unit 450 (e.g., a display adapter, a haptic interface, a human interface device). In various embodiments, this user interface unit 450 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 400 may include one or more other devices or hardware components 460 (e.g., a display or monitor, a keyboard, a mouse, a camera, a fingerprint reader, a video processor). It is understood that the above are merely a few illustrative examples to which the disclosed subject matter is not limited.

The information processing system 400 according to the disclosed subject matter may further include one or more system buses 405. In such an embodiment, the system bus 405 may be configured to communicatively couple the processor 410, the volatile memory 420, the non-volatile memory 430, the network interface 440, the user interface unit 450, and one or more hardware components 460. Data processed by the processor 410 or data inputted from outside of the non-volatile memory 430 may be stored in either the non-volatile memory 430 or the volatile memory 420.

In various embodiments, the information processing system 400 may include or execute one or more software components 470. In some embodiments, the software components 470 may include an operating system (OS) and/or an application. In some embodiments, the OS may be configured to provide one or more services to an application and manage or act as an intermediary between the application and the various hardware components (e.g., the processor 410, a network interface 440) of the information processing system 400. In such an embodiment, the information processing system 400 may include one or more native applications, which may be installed locally (e.g., within the non-volatile memory 430) and configured to be executed directly by the processor 410 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 410.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
a memory storage device comprising:
a memory cell configured to store data;
a temperature sensor configured to detect a temperature of the memory cell; and
an artificial intelligence system configured to determine a temperature trend of the memory cell based on the temperature sensor, and determine a thermal management setting for the memory storage device, based, at least in part, upon the temperature trend and a workload of the memory storage device;
wherein the memory storage device changes a set of operational parameters based on the thermal management setting determined by the artificial intelligence system; and
wherein the artificial intelligence system comprises a neural network arranged to receive an input from the temperature sensor, wherein the neural network is trained based on one or more training values.

2. The apparatus of claim 1, wherein the training data is loaded in an offline mode; and
wherein the neural network is further trained based upon the temperature of the memory cell and the workload based on the memory storage device operating in an online mode.

3. The apparatus of claim 1, wherein the artificial intelligence system is configured to, based on the temperature trend exceeding a first threshold, initiate a cooling sequence.

4. The apparatus of claim 1, wherein the apparatus further includes a second temperature sensor configured to detect a temperature of the memory storage device; and
wherein the artificial intelligence system is configured to determine the thermal management setting, based, at least in part, upon the second temperature sensor.

5. The apparatus of claim 1, wherein the operational parameters comprise parameters selected from the group consisting of: a size of a read/write unit, a size of an erase unit, a size of a read buffer, and a size of a write buffer, a throttling threshold, an amount of memory cell utilization, a cache size and a frequency of garbage collection.

6. The apparatus of claim 1, wherein the artificial intelligence system is configured to cool the memory storage device.

7. The apparatus of claim 1, wherein the artificial intelligence system is configured to determine the thermal management setting to be employed by the memory storage device, based upon a desired power efficiency.

8. A computing device comprising:
a memory storage device configured to store data;
a controller configured to manage a physical state of the computing device; and
a cooling device configured to, at least partially, cool the computing device;
wherein the controller comprises an artificial intelligence system configured to determine a temperature trend of the memory storage device and determine a thermal management setting for the cooling device, based, at least in part, upon the temperature trend of the memory storage device and a workload of the memory storage device;
wherein the cooling device is configured to transfer heat from the computing device based upon the thermal management setting determined by the artificial intelligence system; and
wherein the artificial intelligence system comprises a neural network, wherein the neural network is trained based on one or more training values.

9. The computing device of claim 8, wherein the controller comprises a data collection circuit configured to receive as input:
a workload of the cooling device,
the temperature of the memory storage device, and
the workload of the memory storage device; and
wherein the artificial intelligence system is configured to determine the thermal management setting is selected based, at least in part, upon the workload of the cooling device.

10. The computing device of claim 8, wherein a workload of the memory storage device comprises a workload of data access requests from an operating system, and a workload of data access fulfillments from the memory storage device.

11. The computing device of claim 10, wherein the artificial intelligence system is configured to, based at least in part upon the workload of data access requests from an operating system cool the memory storage device.

12. The computing device of claim 8, wherein the cooling device comprises a fan;
wherein the controller comprises a fan speed controller configured to set a speed of the fan; and
wherein the thermal management setting comprises a determined fan speed.

13. The computing device of claim 8, wherein the artificial intelligence system is configured to determine a rate of airflow within the computing device for the memory storage device to maintain less than or equal to a determined temperature.

14. The computing device of claim 8, further comprising:
a heat generating circuit configured to output a temperature signal; and
wherein the artificial intelligence system is configured to determine the thermal management setting based, at least in part, upon the temperature signal of the heat generating device and wherein the thermal management setting is configured to maintain both the memory storage device and heat generating device at, respective, determined temperatures.

15. A system comprising:
a processor configured to, at least partially, dictate a workload of the memory storage device;
a memory storage device configured to store data, and comprising a first artificial intelligence system configured to determine a local thermal management setting to be used by the memory storage device, based, at least in part, upon detected temperature of at least a portion of the memory storage device and the workload of the memory storage device;
a cooling device configured to, at least partially, cool the system; and
a management controller configured to manage a physical state of the system, and comprising:
a second artificial intelligence system configured to determine a system thermal management setting to be used by the cooling device, based, at least in part, upon a temperature of the memory storage device and a workload of the memory storage device;
wherein the first artificial intelligence system comprises a neural network, wherein the neural network is trained based on one or more training values.

16. The system of claim 15, wherein at least one of the first or second artificial intelligence systems are configured to cool the memory storage device, based, at least in part, upon an estimated workload.

17. The system of claim 15, wherein the memory storage device changes a set of operational parameters in response to the thermal management setting determined by the first artificial intelligence system; and wherein the first artificial intelligence system is at least partially trained via training data that is loaded in an offline mode; and wherein the first artificial intelligence system is further trained based the memory storage device operation in an online mode.

18. The system of claim 15, wherein the second artificial intelligence system is configured to determine the system thermal management setting, based, at least in part, upon a temperature of the processor.

\* \* \* \* \*